Patented Apr. 5, 1938

2,112,970

UNITED STATES PATENT OFFICE 2,112,970

SYNTHESIS OF AMINES

Paul E. Millington, Milwaukee, Wis., assignor to E. I. du Pont de Nemours & Company, Wilmington, Del., a corporation of Delaware No Drawing. Application October 1, 1931, Serial No. 566,313

15 Claims. (Cl. 260—127)

This invention relates to a process for the catalytic synthesis of amines. More particularly it relates to a process for the conversion of tertiary amines to primary or secondary amines, or both.

There are two general methods in use for the direct catalytic synthesis of aliphatic amines from alcohols and ammonia. According to the first of these an alcohol (or alternatively an aldehyde or ketone) may be heated with ammonia and hydrogen in the presence of a hydrogenating-dehydrogenating catalyst. In this process the alcohol is first converted to an aldehyde or ketone which then reacts with the ammonia to form a Schiff's base, which in turn is capable of hydrogenation to amines. In the second process, the amine synthesis is effected by a direct dehydration between the alcohol and ammonia, this process requiring a dehydration catalyst. Amine synthesis by this method is ordinarily carried out in the vapor phase whereas the synthesis involving hydrogenation may be advantageously conducted in the liquid phase under pressure.

It is quite well known that in the synthesis of amines by either of the above mentioned processes, a single product is rarely obtained. In addition to the formation of the primary amines, there is also an appreciable amount of synthesis of secondary and tertiary amines, particularly the latter. It is further known that a primary amine may be treated with additional alcohol in order to form the amines of a higher degree of alkylation, but as far as is known the reverse process of preparing amines of a lower degree of alkylation from tertiary amines (having the highest degree of alkylation of the nitrogen atom) has never been accomplished prior to this invention.

This invention is concerned only with the primary, secondary and tertiary amines and not with quaternary ammonium bases. These primary, secondary and tertiary amines may be said to have degrees of alkylation of 1, 2 and 3 respectively, and such a term as "an amine having a higher degree of alkylation", as will be used herein, is merely relative with respect to another amine in the same series which contains a smaller number of alkyl groups attached to the amino nitrogen, which latter amine may be termed "an amine having a lower degree of alkylation".

The progressive substitution of alkyl groups for replaceable hydrogens of ammonia therefore results in the formation of amines of increasing degrees of alkylation. The reverse process, which is the substance of the invention described herein, consists in the removal of an alkyl group from an amine, substituting hydrogen, and thus results in the production of an amine having a smaller number of alkyl groups attached to the amino nitrogen and therefore it may be said that the applicant's process decreases the degree of alkylation.

The process of the invention described herein is therefore termed "reversion of amines", since an amine having a high degree of alkylation is caused to revert to one having a lower degree of alkylation. Throughout the specification and claims these terms, "amines of lower (higher) degree of alkylation" and "reversion of amines", are used in the sense in which they have been explained.

This invention has for its object the production of amines having a higher amino nitrogen content from amines having a lower amino nitrogen content. More particularly, it is an object of the invention to convert tertiary amines into primary or secondary amines, or both, or to convert secondary amines to primary amines.

These objects are accomplished by the following invention, which in its more general aspects, comprises heating tertiary amines with an excess of ammonia (or a primary amine) in the presence of a suitable catalyst. Under these conditions a reapportionment of the substituent groups attached to the amino nitrogen atom takes place, resulting in the formation of a greater number of amine molecules, but each having a lesser number of substituent groups than originally.

Several alternative procedures by which the objects of the invention may be accomplished are described in the following specific examples:

Example 1

Trimethylamine was placed in an iron pot of approximately ten-gallons capacity connected to an iron distillation column 30 feet in length and 3 inches in diameter. The column was of sufficient strength to withstand pressures up to 200 lbs. such as may be attained in heating amine mixtures to 200° C. The column was filled with ¼ inch iron rings and was equipped with pressure gauges, thermometers, and sight glasses of the usual type required for observing reflux and controlling the temperature and pressure.

Anhydrous liquid ammonia was added in about 100% excess, taken on the basis of one mole of ammonia reacting with two moles of the tertiary amine to produce three moles of the secondary amine product. Heat was gradually applied to the vessel until the mixture refluxed as vigorously as possible without appreciably flooding the column. This was continued for about 24 hours, after which reaction was found to be complete. The excess ammonia was then distilled off under pressure and lastly the product, the major portion of which was dimethylamine. There was also a small amount of monomethylamine and an unimportant amount of unconverted trimethylamine.

Similar results were obtained when monomethyl amine was substituted in the appropriate amount for the ammonia, the excess of monomethylamine being determined on the basis that one mole of monomethylamine will react with one mole of the tertiary amine to produce two moles of secondary amine.

*Example 2*

Five hundred grams of triethylamine was charged into a small autoclave together with 40 grams of finely divided nickel prepared by the reduction with hydrogen of nickel carbonate. The autoclave was closed and 100 grams of anhydrous ammonia was forced into the charge. The mixture was then heated to 150° C. under its own pressure and stirred for about 4 hours. By distilling the reaction products, it was found that about one-half of the triethylamine had been converted to monoethylamine and diethylamine through reaction with the ammonia.

*Example 3*

A catalyst for the synthesis of amines consisting of silica gel impregnated with aluminum oxide was prepared as follows: One hundred cc. of silica gel was heated at 400° C. while being evacuated at a pressure not in excess of 10 mm. After several hours heating, the gel was cooled in a vacuum and covered with a solution of aluminum nitrate prepared by dissolving 20 grams of the hydrated salt in 100 cc. of water. The impregnated gel was drained, dried, and heated at 400° C. for two hours. Fifty cc. of this catalyst was loaded into a tube furnace and heated to 400° C. At this temperature the vapor of tributylamine was passed over the catalyst at the rate of 40 cc. per hour together with gaseous ammonia at a rate sufficient to give 6.5 moles of ammonia per mole of tributylamine. The loss of butylamine through dehydration to butylene was only 3%, the remainder being recovered as liquid products. Analysis of the liquid products indicated a composition of 32% monobutylamine, 36.5% dibutylamine, and 27% tributylamine. There was an inert residue of about 4.5%.

*Example 4*

Trimethylamine was converted smoothly to an amine mixture containing mono, di and trimethylamines by passage over an alumina-silica gel catalyst similar to that described in Example 3. Fifty cc. of the catalyst was loaded into a tube furnace and was heated to 450° C. and 0.33 mole of trimethylamine was passed over it together with 1.19 moles of ammonia in the course of two hours. The products of reaction were scrubbed out of the effluent gas with hydrochloric acid, and the solution of amine hydrochlorides was analyzed for the three amines. The analysis indicated that the product contained 0.155 mole of monomethylamine, 0.119 mole of dimethylamine and 0.161 mole of trimethylamine. These figures represent a recovery of the carbon compounds amounting to about 87%. The formation of inert gaseous compounds through decomposition of the methylamines was negligible.

It will be apparent from the above examples that the invention may be used in conjunction with either of the known processes for amine synthesis already described. When metals are employed as catalysts, the conditions chosen are usually similar to those employed in the prior art for the synthesis of amines by use of a hydrogenating-dehydrogenating catalyst, i. e., a relatively low temperature is used the reaction thus being particularly adaptable to liquid phase conditions as illustrated in Examples 1 and 2. When the reversion is effected, however, by the use of a dehydration catalyst, higher temperatures are required and the process may be carried out in the vapor phase as illustrated in Examples 3 and 4. The process of the invention may be carried out either as a batch operation or a continuous operation. In the batch operation, the reactants are ordinarily heated under pressure, the catalysts being either suspended in the vapor space or stirred in the liquid. Except in the batch processes, pressure is not particularly desirable since it does not ordinarily effect the equilibrium of the reaction.

The catalytic reversion of highly alkylated amines to amines of lower degree of alkylation may be effected over a wide range of temperatures through the use of various catalysts. The temperatures used may range from 50° C., depending on the amines undergoing reaction, the catalyst used and the time permissible for obtaining the desired result. The preferred temperature range for the hydrogenation-dehydrogenation catalyst is 50–350° C. while for dehydration catalysts the preferred upper limit of this temperature range may extend to 450° C. Although this represents the preferred range of temperatures, temperatures higher than these may also be used.

The method above described with relation to the reversion of alkylated amines to amines having a lower degree of alkylation, is applicable to the reversion of aryl amines or to mixed aryl-lkyl amines under substantially similar conditions. The invention has been particularly described in connection with the reversion of alkyl amines, however, since these amines, e. g., tertiary methyl amine, tertiary ethyl amine, tertiary propyl amine, tertiary butyl amine, etc., accumulate in rather large quantities during the operation of prior art synthesis of primary amines from alcohols and ammonia.

It will be understood that the invention is applicable, not only to the reversion of tertiary amines to primary and secondary amines, but also to the reversion of secondary amines to primary amines. Ammonia will ordinarily be used as the base employed for redistributing the alkyl or aryl groups of the amine, but where the amine undergoing reversion is a tertiary amine, ammonia may be replaced in whole or in part by a primary amine. Such primary amine may have a different type of N-attached group than the tertiary amines, and thus cause the formation of mixed secondary amines. On the other hand, where the amine undergoing reversion is a secondary amine, ammonia is used as the distributing base. It is merely necessary that the base employed for effecting the redistribution contain at least two N-substituted hydrogen atoms in excess of those possessed by the amine group being acted upon in the tertiary or secondary amine.

Catalysts suitable for the prior art synthesis of amines from alcohols and ammonia such as the usual hydrogenation-dehydrogenation catalysts, are suitable for use in the reversion of amines. Suitable catalysts of this class are iron, nickel, iron oxide, and copper oxide, preferably in a finely divided condition. In addition to the hydrogenation-dehydrogenation catalysts, dehydration catalysts such as thoria, alumina, silica, titania, etc., may be used.

The above examples illustrate the use of an excess of ammonia in the reversion reaction. Such excess, while not essential, has been found to be beneficial to the rate of reaction. Where a primary amine is used for the reversion of a tertiary amine it is likewise preferable to use a substantial excess over theoretical proportions.

The above description and the examples which describe the specific embodiments of the invention are to be taken as illustrative only and not as limiting the scope of the invention. Any variations and modifications which are within the spirit of the invention are intended to be included within the scope of the claims.

I claim:

1. A process for the reversion of lower aliphatic amines which comprises reacting a lower aliphatic amine having an amine group to the nitrogen atom of which are attached at least two alkyl groups with a compound containing a nitrogen atom to which are attached at least two more hydrogen atoms than are attached to the nitrogen of the said amine group, in the presence of a catalyst taken from the group consisting of hydrogenation-dehydrogenation and dehydration catalysts at a temperature of at least 50° C., said reactants being present in proportions adapted to cause a perceptible and substantial reaction and reversion of the said lower aliphatic amine having an amine group to the nitrogen atom of which are attached at least two alkyl groups.

2. A process for the reversion of lower aliphatic amines which comprises reacting a lower aliphatic amine having an amine group to the nitrogen atom of which are attached at least two alkyl groups with a compound containing a nitrogen atom to which are attached at least two more hydrogen atoms than are attached to the nitrogen of the said amine group, in the presence of a catalyst taken from the group consisting of hydrogenation-dehydrogenation and dehydration catalysts and under a temperature of 50° C. to 450° C., said reactants being present in proportions adapted to cause a perceptible and substantial reaction and reversion of the said lower aliphatic amine having an amine group to the nitrogen atom of which are attached at least two alkyl groups.

3. A process for the reversion of a lower tertiary aliphatic amine to an amine containing at least one hydrogen atom attached to the nitrogen atom, which comprises reacting a lower tertiary aliphatic amine with a compound of the class consisting of ammonia and lower primary aliphatic amines in the presence of a catalyst taken from the group consisting of hydrogenation-dehydrogenation and dehydration catalysts and at a temperature of at least 50° C., said reactants being present in proportions adapted to cause a perceptible and substantial reaction and reversion of the said lower tertiary aliphatic amine.

4. A process for the reversion of a lower tertiary aliphatic amine to an amine containing at least one hydrogen atom attached to the nitrogen atom, which comprises reacting a lower tertiary aliphatic amine with a compound of the class consisting of ammonia and lower primary aliphatic amines in the presence of a catalyst taken from the group consisting of hydrogenation-dehydrogenation and dehydration catalysts, and under a temperature of 50°-350° C., said reactants being present in proportions adapted to cause a perceptible and substantial reaction and reversion of the said lower tertiary aliphatic amine.

5. A process for the reversion of amines which comprises reacting a lower secondary aliphatic amine with ammonia in the presence of a catalyst taken from the group consisting of hydrogenation-dehydrogenation and dehydration catalysts, and at a temperature of at least 50° C.

6. A process for the reversion of amines which comprises reacting a lower secondary aliphatic amine with ammonia in the presence of a catalyst taken from the group consisting of hydrogenation-dehydrogenation and dehydration catalysts, and under a temperature of 50°-350° C.

7. A process for the reversion of amines which comprises reacting a lower tertiary aliphatic amine with a compound of the group consisting of ammonia and a lower primary aliphatic amine, in the vapor phase, and in the presence of a dehydrating catalyst, the reaction temperature being at least 50° C., said reactants being present in proportions adapted to cause a perceptible and substantial reaction and reversion of the said lower tertiary aliphatic amine.

8. A process for the reversion of amines which comprises reacting a lower secondary aliphatic amine with ammonia, in the vapor phase, and in the presence of a dehydrating catalyst, the reaction temperature being at least 50° C.

9. A process for the reversion of lower aliphatic amines which comprises reacting a lower aliphatic amine having an amine group to the nitrogen atom of which are attached at least two alkyl groups with a compound containing a nitrogen atom to which is attached at least two more hydrogen atoms than are attached to the nitrogen of the said amine group in the presence of a dehydration catalyst at a temperature between about 300° C. and about 450° C., said reactants being present in proportions adapted to cause a perceptible and substantial reaction and reversion of the said lower aliphatic amine having an amine group to the nitrogen atom of which are attached at least two alkyl groups.

10. A process for the reversion of amines which comprises reacting a lower secondary aliphatic amine with ammonia, in the vapor phase, in the presence of a dehydrating catalyst and at a temperature between about 300° C. and about 450° C.

11. A process for the reversion of trimethyl amine which comprises reacting said trimethyl amine with ammonia, in the vapor phase, and in the presence of a dehydrating catalyst at a temperature between about 400° C. and about 450° C.

12. A process for the production of di-methyl amine which comprises reacting a mixture of trimethyl amine and ammonia in the vapor phase in the presence of a metal oxide dehydrating catalyst at a temperature between about 400° C. and about 450° C.

13. A process for the production of dimethyl amine which comprises reacting a mixture of trimethyl amine and ammonia in the vapor phase in the presence of alumina at a temperature between about 400° C. and about 450° C.

14. A process which comprises reacting a compound selected from the group consisting of lower tertiary aliphatic amines and lower secondary aliphatic amines with ammonia in the presence of a catalyst taken from the group consisting of hydrogenation-dehydrogenation and dehydration catalysts and at a temperature of at least 50° C.

15. A process for the reversion of lower aliphatic amines which comprises reacting about one mole of a lower aliphatic amine having an amine group to the nitrogen atom of which are attached at least two alkyl groups with about two moles of a compound containing a nitrogen atom to which are attached at least two more hydrogen atoms than are attached to the nitrogen of the said amine group in the presence of a catalyst taken from the group consisting of hydrogenation-dehydrogenation and dehydration catalysts at a temperature of at least 50° C.

PAUL E. MILLINGTON.